June 26, 1962
I. L. LOPATA
3,040,935
DOUGHNUT, PASTRY AND CAKE FILLER
Filed June 3, 1959
3 Sheets-Sheet 1
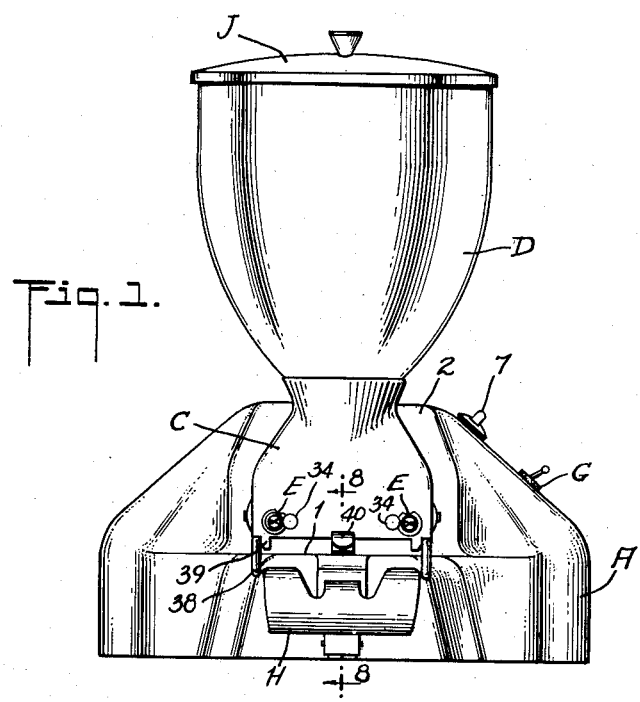
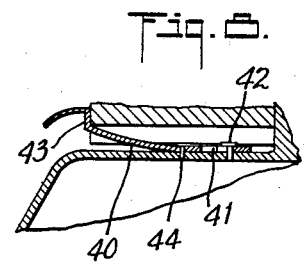
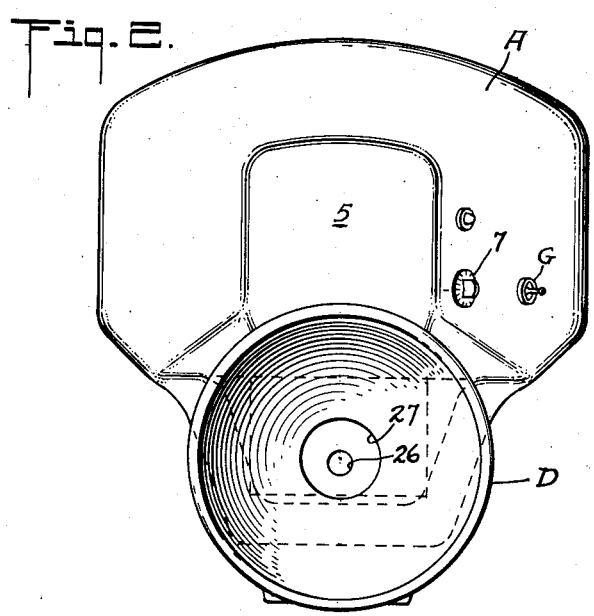
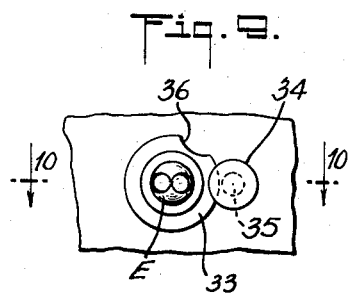
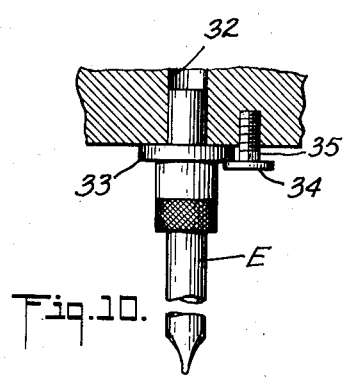
INVENTOR.
IRA L. LOPATA
BY *Harry B. Cook,*
ATTORNEY June 26, 1962 I. L. LOPATA 3,040,935
DOUGHNUT, PASTRY AND CAKE FILLER
Filed June 3, 1959 3 Sheets-Sheet 2
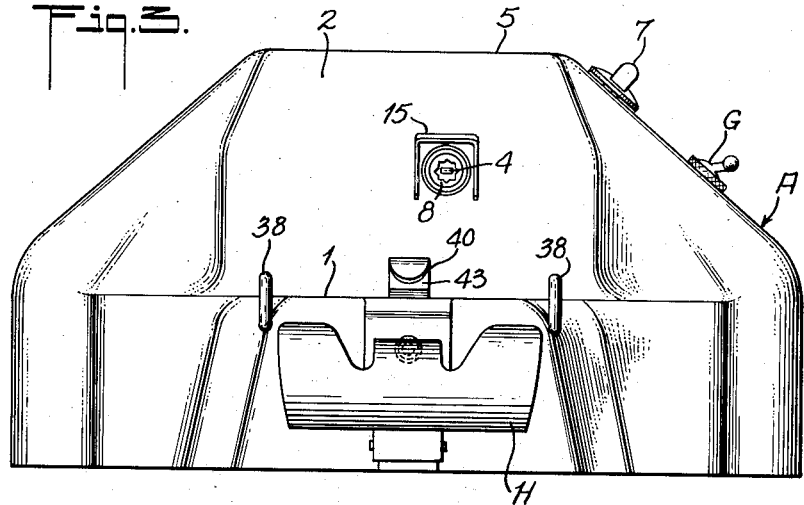
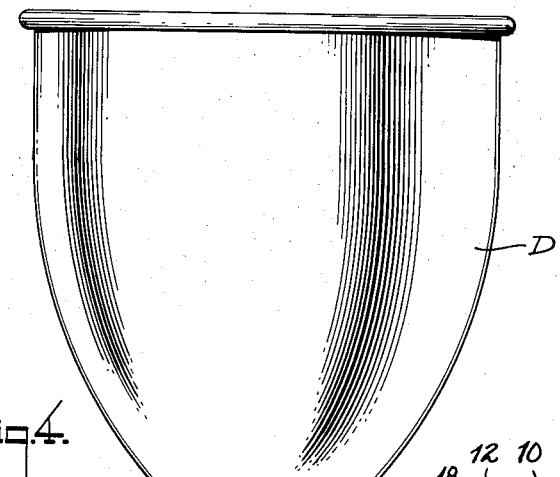
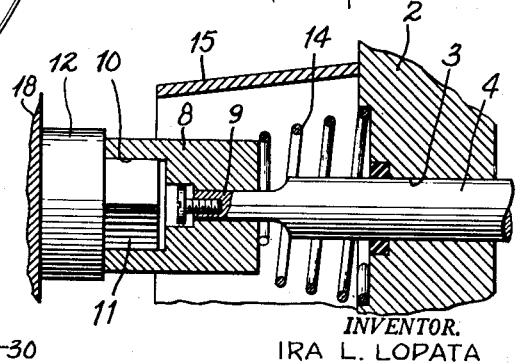
INVENTOR.
IRA L. LOPATA
BY
*Harry Brook*
ATTORNEY June 26, 1962　　　I. L. LOPATA　　　3,040,935
DOUGHNUT, PASTRY AND CAKE FILLER
Filed June 3, 1959　　　3 Sheets-Sheet 3
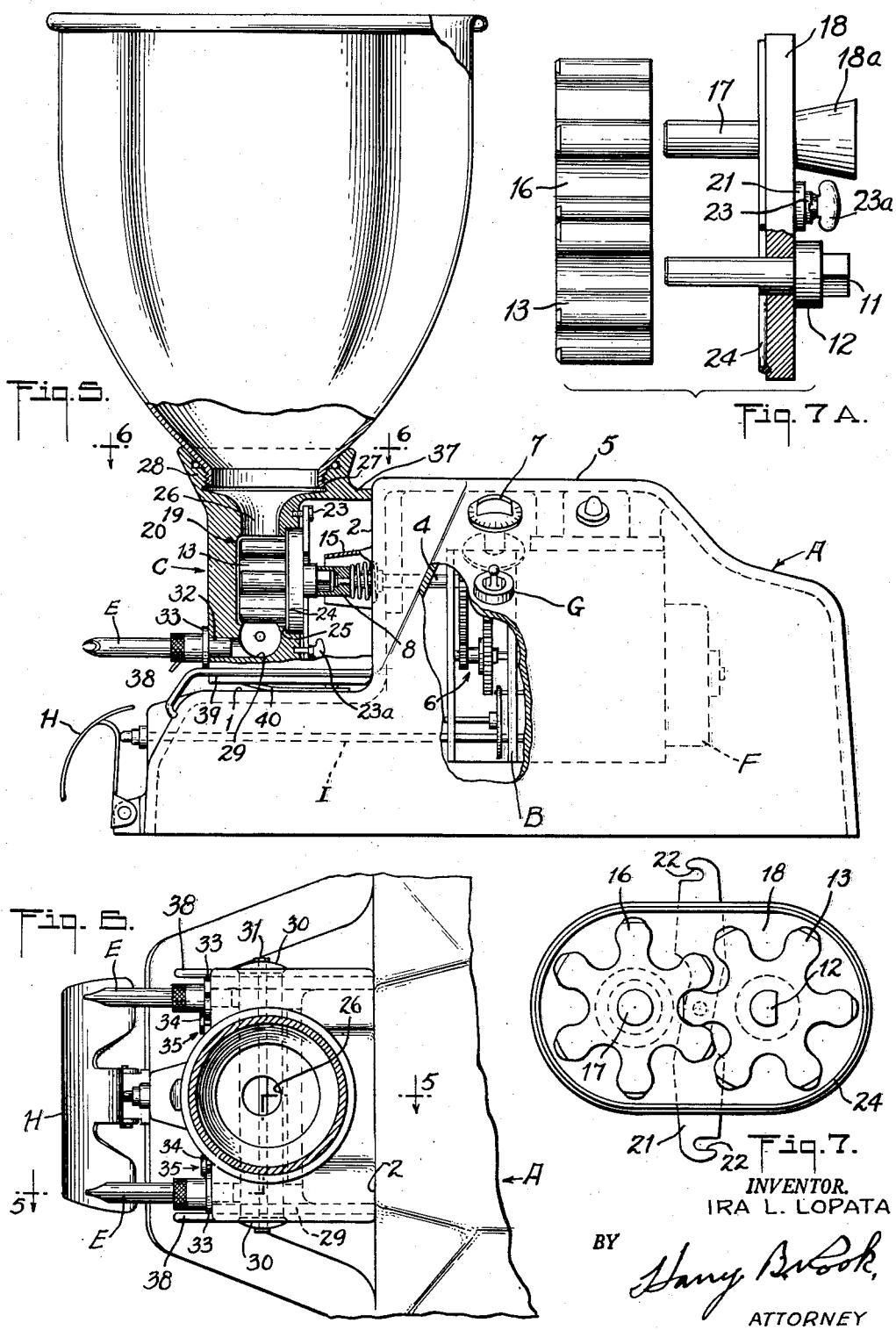
INVENTOR.
IRA L. LOPATA
BY
*Harry Brook*
ATTORNEY … # 3,040,935
DOUGHNUT, PASTRY AND CAKE FILLER
Ira L. Lopata, Fair Lawn, N.J., assignor to Ragen Precision Industries, Inc., North Arlington, N.J., a corporation of New Jersey
Filed June 3, 1959, Ser. No. 817,796
2 Claims. (Cl. 222—185)

This invention relates in general to a machine for automatically delivering pre-determined quantities of a semi-liquid material such as jelly, cream, custard, batter, dough, and the like, and more particularly, the invention contemplates a machine of the type that includes a bowl or receptacle for a filling material such as jelly, and a motor-driven measuring and pumping apparatus for drawing the material from the bowl in measured quantities and injecting it through a nozzle into a doughnut, a piece of pastry, a cake, a baking pan, or the like.

A primary object of the invention is to provide a machine of this character which shall embody a novel and improved construction whereby a plurality of the bowls can be easily and instantly interchangeably mounted in the machine so that the machine may be utilized selectively and with a minimum of difficulty and loss of time for handling any desired type or flavor of filling.

Another object of the invention is to provide such a machine which shall include a novel and improved unit comprising a bowl or receptacle and a pump or ejecting means for the filling material, and a novel combination thereof with a main frame or base and motor-operated driving mechanism, whereby the bowl and pump unit, at the will of the operator, can be easily and instantly set on and removed from the base or main frame and connected to and disconnected from a driving shaft, respectively, easily and instantly and without the use of tools, and the amount of filling material ejected from the filling nozzle can be easily and instantly varied as by a mere "flick of the wrist" of the operator.

A further object is to provide in a machine for filling doughnuts, pastry, cakes, baking pans, and the like, a novel and improved combination of a bowl, a positive displacement pump, and filling nozzles which shall eliminate dripping of the filling material from the nozzles after operation of the pump has stopped, which shall positively and smoothly move the filling material from the bowl to the nozzle, which shall be smooth running and practically noiseless, and which can be easily and quickly assembled and disassembled for cleaning, inspection, and repair.

Other objects of the invention are to provide such a machine which shall be light in weight and easily portable, which can be economically operated by a relatively unskilled person and with low power consumption; and to obtain other advantages and results that will be brought out by the following description in conjunction with the accompanying drawings in which:

FIGURE 1 is a front elevation of a machine embodying the invention;

FIGURE 2 is a top plan view thereof;

FIGURE 3 is an enlarged front elevation of the base or main frame of the machine with the bowl and pump unit removed.

FIGURE 4 is a rear elevation of the bowl and pump unit removed from the main frame or base;

FIGURE 5 is an enlarged side elevation of the machine with portions broken away and shown in vertical section;

FIGURE 6 is a horizontal sectional view approximately on the plane of the line 6—6 of FIGURE 5;

FIGURE 7 is a front elevational view of the displacement pump gears and their supporting plate removed from the pump casing;

FIGURE 7a is an exploded top plan view of the pump gears and their supporting plate;

FIGURE 8 is a fragmentary vertical sectional view approximately on the plane of the line 8—8 of FIGURE 1;

FIGURE 9 is an enlarged front elevation of one of the filling nozzles and the means for connecting it to the pump casing;

FIGURE 10 is a horizontal sectional view on the plane of the line 10—10 of FIGURE 9; and FIGURE 11 is an enlarged fragmentary longitudinal vertical sectional view of the coupling between the drive shaft and the pump.

Specifically describing the illustrated embodiment of the invention, the machine is shown as comprising a main frame or base A that is in the form of a hollow shell with an open bottom, and having mounted therein a driving and control mechanism B for a pump unit C which is adapted to transfer filling material from a receptacle or bowl D to one or more filling nozzles E.

As above indicated, an important feature of the invention is the provision of means whereby the pump unit and bowl can be easily and quickly mounted on and removed from the base and simultaneously connected to and disconnected from the driving mechanism, respectively, so that the machine shall be adapted for injecting different fillings or fillings of different flavor with a minimum of difficulty. As shown, the base has a horizontal shelf or ledge 1 for supporting the bowl and pump combination and a vertical wall 2 having an opening 3 through which projects the output shaft 4 of the driving mechanism B that is shown as mounted on the top wall 5 of the base and includes an electric motor F and a train of gearing 6 connected to the output shaft 4 to drive the latter. Preferably, the motor F continuously rotates during the operation of the machine and may be started and stopped by a known type of manually operated switch G, and there is a control mechanism for automatically connecting the motor to and disconnecting it from the gear train 6, said mechanism including a finger lever H to be engaged by the fingers of the operator and which, when pressed in one direction, pushes a push rod I to connect the motor to the gear train and start rotation of the shaft 4. A control mechanism is provided for automatically stopping the rotation of the shaft 4 by the motor after a pre-determined degree of rotation of the shaft 4, said mechanism being regulated by the operator through a knob 7 that can be operated with a "flick of the wrist," thereby to control the amount of filling material to be ejected from the bowl through the nozzle E into the doughnut or the like. The driving and control mechanism is more fully described in my pending application, Serial No. 856,689, filed December 2, 1959, now Patent No. 3,002,599.

A quick connection and disconnection of the shaft 4 to and from the pump is provided by a coupling sleeve 8 that is slidably mounted on a polygonal end portion 9 of the shaft 4 and has a polygonal socket 10 to receive and drivingly engage a correspondingly shaped projection 11 on the end of the stub shaft 12 on which one gear 13 of the pump unit is mounted for rotation by the shaft. A compression spring 14 is interposed between the coupling sleeve 8 and the wall 2 of the base to provide the desired tolerance in connecting the pump shaft 12 to the coupling sleeve and for maintaining a snug contact of the parts. A hood 15 over the end of the shaft 4 is provided on the wall 2 for restricting the accumulation of filling material and the like on the coupling.

The pump unit includes another gear 16 similar to the gear 13 that is mounted on a stud shaft 17 that projects from a mounting plate 18 in which the shaft 12 is also journaled, and in accordance with the invention, the gears and mounting plate are removed from the pump chamber 19 of the pump casing 20 for easy and quick cleaning, inspection, and repair. As shown, a locking lever 21 is pivotally mounted intermediate its ends at 21a on the mounting plate 18 and has oppositely facing slots 22 in its ends engageable respectively with a stud 23 and a thumb screw 23a on the pump casing for positively connecting the mounting plate to the pump casing with the gears in the pump chamber. Obviously, rotation of the lever 21 in one direction will cause engagement of the lever with the studs 23 to lock the plate in position, while rotation of the lever in the opposite direction will disengage the lever from the studs and permit removal of the mounting plate and gears. A packing ring or gasket 24 is provided in the mounting plate to engage the bottom wall of a rabbet 25 in the pump casing in which the mounting plate is seated, and a knob 18a is provided on the plate for easy handling thereof.

The pump chamber 19 has an inlet 26 leading from the bottom of the bowl (FIGURES 5 and 6), and the bowl preferably has a screw-threaded neck portion 27 at its lower end that has a screw-threaded connection with a seat 28 in the upper end of the pump casing.

The lower end of the pump casing has an outlet 29 which preferably constitutes a bore extending entirely from one end of the pump casing to the other which is normally closed by removable caps 30, one at each end of the bore and connected together by a rod 31, so that by removal of the caps, the passage can be easily cleaned. The caps are screwed on the rod.

As shown, each filling nozzle E is tubular and pointed at its outer end for easy penetration of a doughnut or the like and having its other end slidably fitted into a hole 32 that communicates with the outlet passage 29 of the pump. For easy and quick connection and disconnection of the nozzle to and from the pump casing, the nozzle is provided with a circumferential flange 33 to underlie the head 34 of a stud 35 that projects from the front wall of the pump casing as best shown in FIGURES 9 and 10, the flange 33 having an arcuate cutaway portion 36, which when brought into register with the head 34 of the stud, will permit the nozzle to be moved longitudinally into and out of the hole 32, thereby permitting attachment and detachment of the nozzles for cleaning or any desired purposes without the manipulation of screws or nuts.

As hereinbefore stated, the combined bowl and pump unit is separably mounted on the base A, and as shown, the rear side of the pump casing has a skirt 37 to abut the wall 2 and automatically space the pump casing with respect to said wall so as to insure proper engagement of the pump gear shaft 12 with the coupling sleeve 8, and rails 38 are mounted on the shelf 1 of the base so that the pump casing can be slid on the rails into position against the wall 2. To facilitate this operation, the bottom wall of the pump casing has guide fins 39 projecting therefrom to engage the respective rails as best shown in FIGURE 1. To permit a "snap on" attachment of the pump casing to the base, a spring latch 40 has one end separably attached to the shelf as by means of a bayonet slot 41 in the end of the spring coacting with a stud 42 on the shelf, the outer end of the spring having an upturned shoulder portion 43 to engage the front face of the pump casing as best shown in FIGURE 8. Preferably, a pin 44 projects downwardly from the spring into a hole in the shelf to prevent rotation of the spring. With this construction, it will be seen that the pump casing and bowl unit can be set on the rails 38 with the spring 40 depressed and easily pushed rearwardly against the wall 2 of the base, whereupon the free end 43 of the spring will snap upwardly into engagement with the front face of the pump unit as shown in FIGURE 8.

As the pump and bowl unit is slid rearwardly, the coupling element at the end of the shaft 12, i.e., the polygonal end 11, slides into the coupling element or sleeve 8 on the output shaft 4, thereby to connect the pump to the driving means B. With this construction, the pump and bowl unit, at the will of the operator, can be easily and instantly removed and another unit quickly substituted, for example, to change the filling materials, and without the use of tools or fastening elements. There are no operating parts in or projecting from the filling receptacle or bowl D that might interfere with filling of the bowl or become "gummed up" by the filling material; and the filling material may be constantly covered by a removable cover on the bowl D, both while the bowl and pump unit are separated from the machine and temporarily set aside and while the bowl and pump unit are mounted on the machine during operation thereof. The filling material is positively, smoothly, and in predetermined or measured quantities, forced from the bowl to the filling nozzle, and all dripping of the filling material from the nozzles after operation of the pump has stopped is eliminated. The machine is smooth running and practically noiseless, and parts thereof can be easily and quickly assembled and disassembled for cleaning, inspection, and repair.

While the now preferred embodiment of the invention has been illustrated and described, it should be understood that this is primarily for illustrating the principles of the invention and that the structural details of the machine may be widely modified and changed within the scope of the appended claims.

I claim:

1. A filling machine including a frame, driving means thereon, a unit comprising a filling material receptacle having an outlet at its bottom end and filling material ejecting means including a casing having an inlet at its top communicating with said outlet of the receptacle to receive material from the receptacle and also having a discharge opening for said material, said driving means having an output shaft with one end exposed, said ejecting means having a driven shaft journaled in said casing, said frame having a horizontal shelf below and outwardly of said end of the output shaft and said casing having a bottom wall separably engageable with said horizontal shelf providing for setting of said unit upon said shelf and slidability of the unit toward and from said exposed end of the output shaft with said driven shaft in axial alignment with said output shaft, each of said shafts having a coupling element quickly coaxially connectible to and disconnectible from the coupling element on the other shaft upon sliding movement of said unit on said shelf toward and from said output shaft, respectively, and spring catch means on said shelf to releasably engage said unit upon sliding of the unit toward the output shaft into the position at which said coupling elements are connected and to hold said unit against sliding on the shelf while said coupling elements are connected together.

2. A filling machine including a frame, driving means thereon, a unit comprising a filling material receptacle having an outlet at its bottom end and filling material ejecting means including a casing having an inlet at its top communicating with said outlet of the receptacle to receive material from the receptacle and also having a discharge opening for said material, said driving means having an output shaft with one end exposed, said ejecting means having a driven shaft journaled in said casing, said frame having a horizontal shelf below and outwardly of said end of the output shaft and said casing having a bottom wall separably engageable with said horizontal shelf providing for setting of said unit upon said shelf and slidability of the unit toward and from said exposed end of the output shaft with said driven shaft in axial alignment with said output shaft, each of said shafts having a coupling element quickly coaxially connectible to and disconnectible from the coupling element on the other shaft upon sliding movement of said unit on said shelf toward and from said output shaft, respectively, and horizontal upwardly projecting rails on said shelf providing seats for the bottom wall of said casing, and guide fins on said bottom wall of the casing, each slidably engageable with one of said rails, thereby to hold the unit against sidewise displacement from the shelf.

References Cited in the file of this patent

UNITED STATES PATENTS

| | | |
|---|---|---|
| 1,623,587 | Frederickson | Apr. 5, 1927 |
| 2,545,588 | Pulse | Mar. 20, 1951 |
| 2,793,791 | Clark | May 28, 1957 |
| 2,880,676 | Succop | Apr. 7, 1959 |